(12) United States Patent
Honma et al.

(10) Patent No.: US 8,512,032 B2
(45) Date of Patent: Aug. 20, 2013

(54) MULTI-AXIS INJECTION MOLDING APPARATUS

(75) Inventors: Akihiro Honma, Tochigi (JP); Kenji Hayashi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 23 days.

(21) Appl. No.: 13/032,114

(22) Filed: Feb. 22, 2011

(65) Prior Publication Data

US 2011/0223273 A1     Sep. 15, 2011

(30) Foreign Application Priority Data

Mar. 10, 2010   (JP) .................................. 2010-052522

(51) Int. Cl.
*B29C 45/22* (2006.01)

(52) U.S. Cl.
USPC .......................................... 425/572; 425/573

(58) Field of Classification Search
USPC ................................. 425/572, 573
See application file for complete search history.

(56) References Cited

U.S. PATENT DOCUMENTS

| 4,793,795 | A | * | 12/1988 | Schmidt et al. | ............... 425/549 |
| 5,192,555 | A | * | 3/1993 | Arnott | ........................... 425/544 |
| 7,207,796 | B2 | * | 4/2007 | Rosner | ........................... 425/569 |
| 7,867,430 | B2 | * | 1/2011 | Shin et al. | .................. 264/328.8 |

FOREIGN PATENT DOCUMENTS

| CN | 1976795 A | 6/2007 |
| JP | 2005-280025 A | 10/2005 |
| WO | WO 2006/002512 A1 | 1/2006 |

OTHER PUBLICATIONS

Chinese Office Action, Application No. 201110058912.0, dated May 15, 2013.

* cited by examiner

*Primary Examiner* — Tim Heitbrink
(74) *Attorney, Agent, or Firm* — Arent Fox LLP

(57) ABSTRACT

A multi-axis injection molding apparatus is provided with a fixed platen, a movable platen, a plurality of injection devices, and an intermediate platen disposed between a fixed mold and the fixed platen. The intermediate platen includes a runner adapted to supply a molten resin from a single in-line injection apparatus to the plurality of injection devices.

11 Claims, 3 Drawing Sheets

MULTI-AXIS INJECTION MOLDING APPARATUS

BACKGROUND OF THE INVENTION

1. Field of the Invention

The present invention relates to a multi-axis injection molding apparatus in which a molten resin is injected into a cavity by a plurality of plungers.

2. Related Art

JP-A-2005-280025 discloses an injection molding apparatus in which a molten resin is injected into a cavity by a plurality of plungers. In the injection molding apparatus, a plurality of injection plunger units are provided on a back side of a fixed platen. A plasticized resin is supplied from a single in-line injection apparatus (a plasticizing device) through a flexible resin supply pipe to the plurality of injection plunger units. By injecting the molten resin of the injection plunger units into the cavity, a product is formed.

In the injection molding apparatus of JP-A-2005-280025, in order to engage the injection plungers with their respective plurality of nozzle touches formed in a mold, it is necessary to form a plurality of holes in the fixed platen. Therefore, the fixed platen must be designed specially in order to maintain a necessary strength of the fixed platen, and also a whole of the injection molding apparatus must be newly designed. As a result, a production cost of the injection molding apparatus is increased.

SUMMARY OF THE INVENTION

One or more embodiments of the invention provide a multi-axis injection molding apparatus which can realize a simple and inexpensive multi-axis structure by simply improving a conventional injection molding apparatus of a typical type.

In accordance with one or more embodiments of the invention, a multi-axis injection molding apparatus is provided with: a fixed platen 1; a movable platen 2; a plurality of injection devices 7; and an intermediate platen 6 disposed between a fixed mold 4 and the fixed platen 1 and formed with a runner 11 adapted to supply a molten resin from a single in-line injection apparatus 9 to the plurality of injection devices 7.

Other aspects and advantages of the invention will be apparent from the following description and the appended claims.

DETAILED DESCRIPTION OF THE EXEMPLARY EMBODIMENTS

Figure 1A:
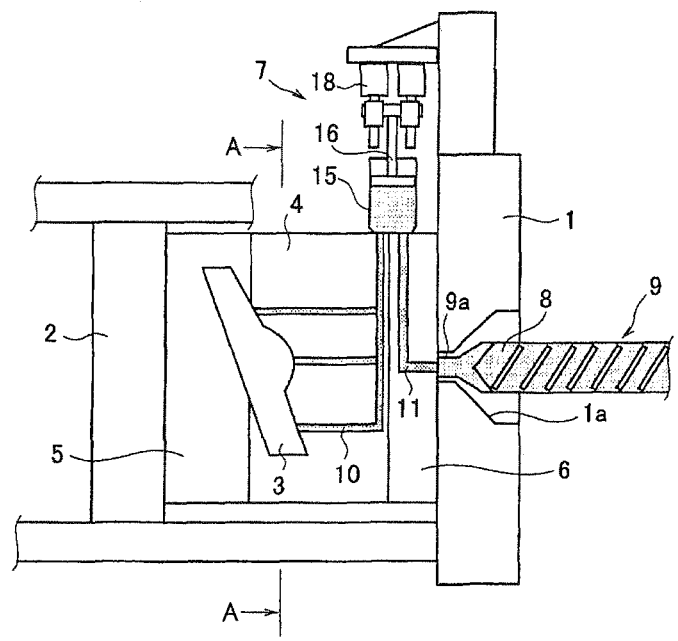
FIG. 1A is a partially sectional side view of a multi-axis injection molding apparatus according to an exemplary embodiment, showing a state thereof when molds are closed.
Figure 1B:
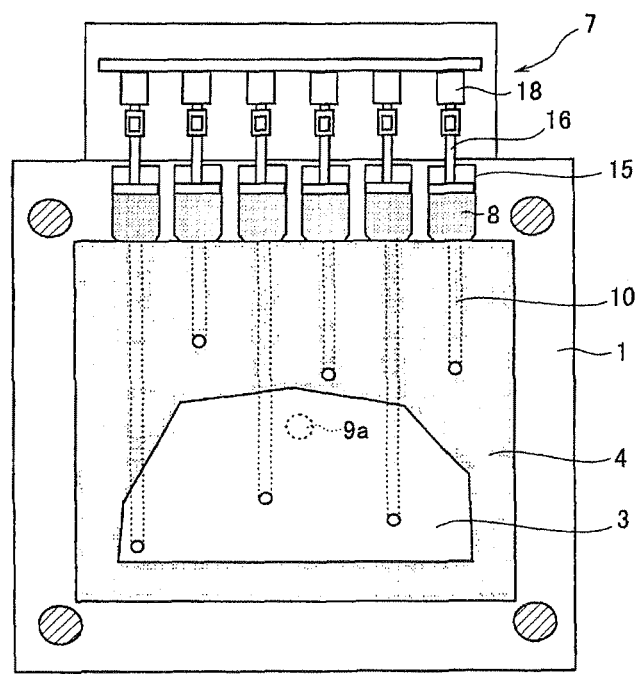
FIG. 1B is a section view thereof taken along the arrow line A-A shown in FIG. 1A.

An exemplary embodiment is described with reference to the accompanying drawings. A multi-axis injection molding apparatus of the exemplary embodiment includes a fixed platen 1, a movable platen 2, a fixed mold 4 and a movable mold 5 cooperating together to define a cavity 3, an intermediate platen 6, a plurality of injection devices 7, an in-line injection apparatus 9 for supplying molten resin 8 to the injection devices 7 through the intermediate platen 6. The fixed mold 4 is mounted on the fixed platen 1 through the intermediate platen 6, while the movable mold 5 is mounted on the movable platen 2. In an example of FIG. 1B, there are six injection devices 7. However, according to the exemplary embodiment, the number of the injection devices may be one or more.

A penetration hole 1a is formed in the fixed platen 1. Through the penetration hole 1a, a nozzle 9a provided in the in-line injection apparatus 9 extends. The fixed mold 4 includes a plurality of runners 10 respectively used to fill the molten resin 8 injected by the respective injection devices 7 into the cavity 3, while the runners 10 are formed independently of each other so as to correspond to their associated injection devices 7. Also, the intermediate platen 6 includes a runner 11 through which the molten resin 8 plasticized and injected by the in-line injection apparatus 9 can be supplied independently to the respective injection devices 7.

Figure 2A:
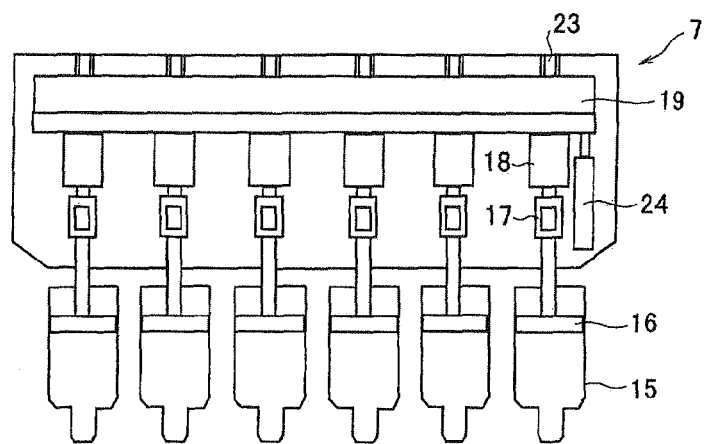
FIG. 2A is a front view of injection devices used in the multi-axis injection molding apparatus.
Figure 2B:
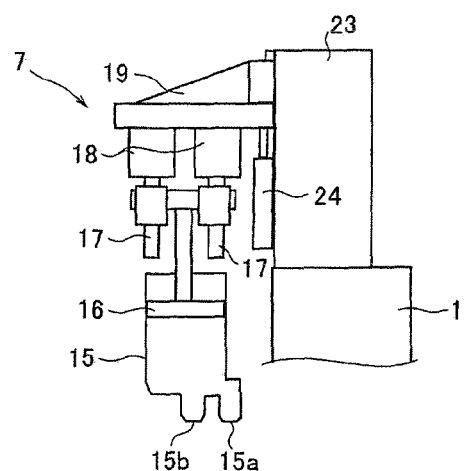
FIG. 2B is a side view of the injection device.
Figure 2C:
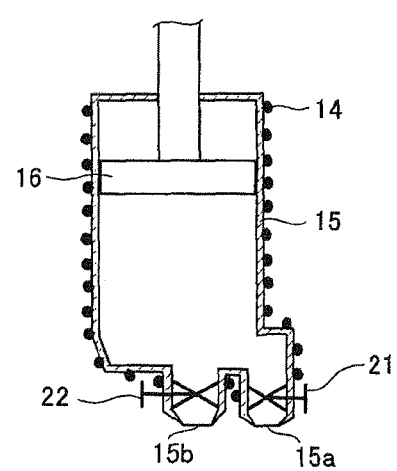
FIG. 2C is a general section view of a main portion of the injection device.

The injection devices 7 are respectively interposed between the fixed platen 1 and movable platen 2. In an example shown in FIGS. 2A to 2C, each injection device 7 includes a cylinder 15. A periphery of the each of the injection device 7 may be covered with heating elements 14. The cylinder 15 is used to store the molten resin 8 therein. In the example shown in FIGS. 2A to 2C, the each injection device 7 also includes a plunger 16 slidable within the cylinder 15 for injecting the molten resin 8, a pair of ball screws 17 and 17 capable of advancing or retreating the plunger 16, a pair of servo motors 18 and 18 for driving their respective ball screws 17, and a mounting member 19 for fixing the servomotors 18 thereto. Further, according to the exemplary embodiment, the injection device 7 is not limited to the specific structure of the example of FIGS. 2A to 2C, but it may only have a mechanism which is capable of injecting resin; and thus, the injection device 7 can be driven by any driving means.

In a leading end portion of the cylinder 15, there are formed a nozzle-like entrance 15a which is used to supply the molten resin 8 into the cylinder 15 through the runner 11 provided in the intermediate platen 6, and a nozzle-like exit 15b used to fill the molten resin 8 stored within the cylinder 15 into the cavity 3 through the runners 10 respectively provided in the fixed mold 4.

In the vicinity of the entrance 15a, there is provided a resin supply side valve 21 which is used to open and close the entrance 15. In the vicinity of the exit 15b, there is provided a resin injection side valve 22 used to open and close the exit 15b. Further, the multi-axis injection molding apparatus includes a control unit (not shown) which controls opening and closing operations of the resin supply side valve 21 and resin injection side valve 22 and also controls advancing and retreating operations of the plungers 16 independently according to the respective injection devices 7. However, this structure is not limitative but, essentially, between the passages of the nozzle 9a and entrance 15, there may be provided the resin supply side valve; and, between the entrance 15b and cavity, there may be provided the injection side valve.

The injection device 7 may be mounted on the fixed platen 1 slidably (movably up and down) relative to the fixed platen 1 through a slider unit 23 constituted of a guide and a rail or the like. The injection device 7 can be engaged with and disengaged from the fixed mold 4 using a hydraulic cylinder 24. When the injection device 7 is engaged with the fixed mold 4, the entrance 15a formed in the leading end portion of the cylinder 15 is connected to the runner 11 of the intermediate platen 6, while the exit 15b is connected to the runner 10 of the fixed mold 4. However, this is not limitative but, essentially, each injection device 7 may include a mechanism which is provided integrally with or separately from it and also which is capable of engaging the injection device with a mold and an intermediate platen and disengaging the former from the latter.

In order that, in the fixed mold 4, the runners 10 and gates (not shown) can be designed properly according to products to be molded, the injection device 7 may be structured such that a position of the injection device 7 with respect to the fixed platen 1 can be freely changed by adjusting a shape of the mounting member 19 or the assembling position of the slider 23 used to mount the mounting member 19 thereon.

Figure 3A:
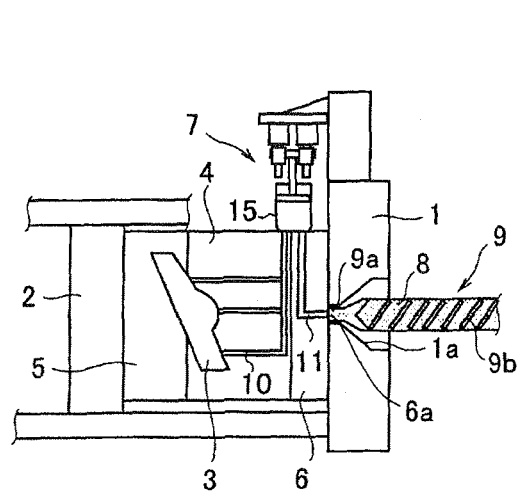
FIG. 3A is an explanatory view of an operation of an in-line injection apparatus, showing a state when the in-line injection apparatus plasticizes resin.

Now, description will be given below of the operations of the above-structured multi-axis injection molding apparatus of the exemplary embodiment. As shown in FIG. 3A, the nozzle 9a of the in-line injection apparatus 9 is inserted into the penetration hole 1a, the nozzle 9a is engaged with the nozzle touch portion 6a, and the nozzle 9a is thereby connected to the runner 11 of the intermediate platen 6.

In the in-line injection apparatus 9, the screw 9b is rotated and the resin 8 is thereby plasticized. A leading end portion of the cylinder 15 of the injection device 7 is contacted with the intermediate platen 6 and fixed mold 4 due to the operation of the hydraulic cylinder 24, the entrance 15a formed in the leading end portion of the cylinder 15 is directly contact with and connected to the runner 11 of the intermediate platen 6, and the exit 15b is directly contact with and connected to the runner 10 of the fixed mold 4.

Figure 3B:
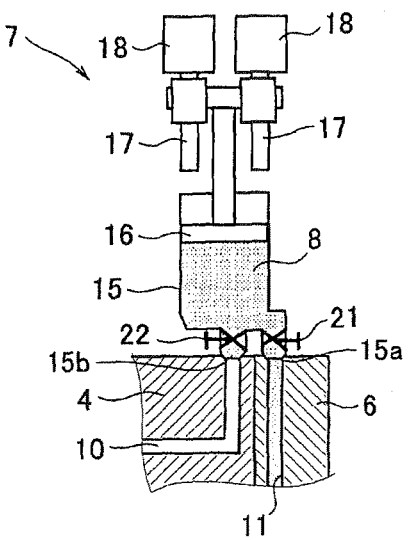
FIG. 3B is an explanatory view of the operation of the in-line injection apparatus, showing a state when the in-line injection apparatus supplies resin to an injection device.

Next, as shown in FIG. 3B, the resin injection side valves 22 of the respective injection devices 7 are closed and the resin supply side valves 21 are opened. And, the screw 9b of the in-line injection apparatus 9 is moved forward to thereby supply the molten resin 8 into the respective cylinders 15 through the forked runner 11 of the intermediate platen 6. At the then time, in the injection devices 7, while detecting the pressures of their respective molten resin 8, the plungers 16 are moved backward. As a result of this, the molten resin 8 is filled into the respective cylinders 15.

Figure 3C:
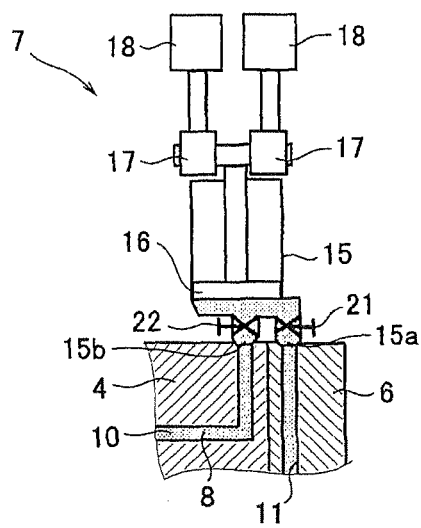
FIG. 3C is an explanatory view of a resin supply operation by the injection device.

Next, as shown in FIG. 3C, the resin supply side valves 21 of the respective injection devices 7 are closed, while the resin injection side valves 22 are opened. And, the plungers 16 of the injection devices 7 are moved forward to thereby supply the molten resin 8 into the cavity 3 through the runners 10 of the fixed mold 4. At the then time, in the injection devices 7, while controlling the speeds of the plungers 16, the plungers 16 are moved forward.

Figure 3D:
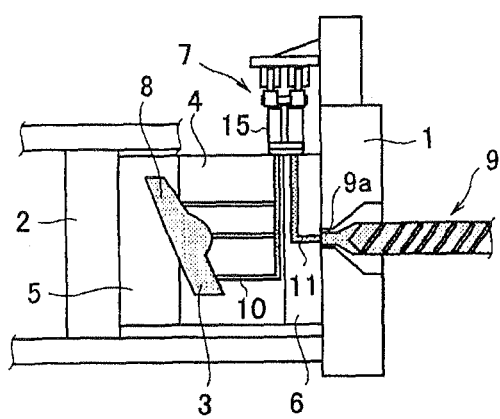
FIG. 3D is an explanatory view of the resin filling operation of the injection device when it fills the resin into a cavity.

As a result of this, as shown in FIG. 3D, owing to the injection operations of the respective injection devices 7, the molten resin 8 is filled into the cavity 3 at a proper timing through the runners 10 of the fixed mold 4.

As described above, the opening and closing operations of the resin supply side valves 21 and resin injection side valves 22 of the injection devices 7 as well as the advancing timings and advancing speeds of the plungers 16 of the injection devices 7 can be controlled separately by the control unit (not shown) with respect to the respective injection devices 7.

According to the exemplary embodiment and the modified examples thereof, it may be possible to structure a multi-axis injection molding apparatus by simply adding an intermediate platen with a branched runner formed therein and a plurality of injection devices capable of supplying molten resin through the runner of the intermediate platen to a conventionally ordinary injection molding apparatus, without remodeling the fixed platen thereof. Also, in the case that the intermediate platen is removed from the injection molding apparatus and the added injection devices are dismounted, the multi-axis injection molding apparatus may also be used as a conventional injection molding apparatus.

In accordance with the exemplary embodiment and the modified examples thereof, a the multi-axis injection molding apparatus may include: a fixed platen 1; a movable platen 2; a plurality of injection devices 7; and an intermediate platen 6 disposed between a fixed mold 4 and the fixed platen 1 and formed with a runner 11 adapted to supply a molten resin from a single in-line injection apparatus 9 to the plurality of injection devices 7.

According to the above structure, it may be possible to provide a multi-axis injection molding apparatus by simply adding an intermediate platen with a runner formed therein and a plurality of injection devices to a conventional injection molding apparatus of a typical type, without substantially modifying the fixed platen thereof. Also, by mounting and dismounting the intermediate platen, the apparatus can be easily switched over between the conventional injection molding apparatus and the multi-axis injection molding apparatus.

In the above structure, each of the injection devices 7 may include: a resin supply side valve 21 adapted to adjust a supply of the molten resin from the intermediate platen 6; and a resin injection side valve 22 adapted to adjust a supply of the molten resin to a cavity 3 defined by the fixed mold 4 and a movable mold 5. The multi-axis injection molding apparatus may further include a control unit adapted to control operations of the resin supply side valve 21 and the resin injection side valve 22 and operations of plungers 16 of the injection devices 7 independently from each other. Thanks to this structure, even when the plurality of injection devices 7 simultaneously inject resin, pressures and flow rates of the resin may be independently controlled.

In the above structure, the injection devices 7 may be disposed so that respective positions of the injection devices 7 are changeable. Thanks to this structure, it may be possible to design runners and gates in their optimum manner according to products to be molded.

In the above structure, the fixed platen 1 may include a penetration hole 1a. The penetration hole 1a may be adapted such that a nozzle 9a of the in-line injection device 9 is inserted into the penetration hole 1a to be engaged with a nozzle touch portion 6a of the intermediate board 6 and the nozzle 9a and the runner 11 are connected to each other.

In the above structure, each of the injection devices 7 may include a cylinder 15. The cylinder 15 may include an entrance 15a and an exit 15b. The entrance 15a may be configured to directly contact with the runner 11 of the intermediate platen 6 so as to be connected with the runner 11 of the intermediate platen 6. The exit 15b may be configured to directly contact with a runner 10 of the fixed mold 4 so as to be connected with the runner 10 of the fixed mold 4.

While description has been made in connection with the specific exemplary embodiment and modified examples thereof, it will be obvious to those skilled in the art that various changes and modifications may be made therein without departing from the present invention. It is aimed, therefore, to cover in the appended claims all such changes and modifications falling within the true spirit and scope of the present invention.

DESCRIPTION OF REFERENCE NUMERALS AND SIGNS

1: Fixed platen
2: Movable platen
3: Cavity
4: Fixed mold
5: Movable mold
6: Intermediate platen
7: Injection device
8: Molten resin
9: In-line injection apparatus
10, 11: Runner
15: Cylinder
16: Plunger
17: Pole screw
18: Servo motor
21: Resin supply side valve
22: Resin injection side valve

What is claimed is:

1. A multi-axis injection molding apparatus comprising:
a fixed platen;
a movable platen;
a plurality of injection devices; and
an intermediate platen disposed between a fixed mold and the fixed platen and formed with a runner adapted to supply a molten resin from a single in-line injection apparatus to the plurality of injection devices,
wherein each of the injection devices includes a cylinder that stores the molten resin therein, and a plunger slidable within the cylinder so as to inject the molten resin, and
wherein the cylinder of each of the injection devices includes an entrance and a separate exit.

2. The multi-axis injection molding apparatus according to claim 1,
wherein each of the injection devices includes:
a resin supply side valve provided on said entrance and adapted to adjust a supply of the molten resin from the intermediate platen; and
a resin injection side valve provided on said exit and adapted to adjust a supply of the molten resin to a cavity defined by the fixed mold and a movable mold, and
wherein the resin supply side valve and the resin injection side valve and the plungers of the injection devices operate independently from each other.

3. The multi-axis injection molding apparatus according to claim 1, wherein the injection devices are disposed so that respective positions of the injection devices are changeable.

4. The multi-axis injection molding apparatus according to claim 1, wherein the fixed platen includes a penetration hole, and
wherein the penetration hole is adapted such that a nozzle of the in-line injection device is inserted into the penetration hole to be engaged with a nozzle touch portion of the intermediate platen and the nozzle and the runner are connected to each other.

5. The multi-axis injection molding apparatus according to claim 1,
wherein the entrance is configured to directly contact with the runner of the intermediate platen so as to be connected with the runner of the intermediate platen, and
the exit is configured to directly contact with a runner of the fixed mold so as to be connected with the runner of the fixed mold.

6. The multi-axis injection molding apparatus according to claim 1, wherein the fixed mold is formed with a runner adapted to supply a molten resin from the plurality of injection devices into a mold cavity.

7. The multi-axis injection molding apparatus according to claim 2, wherein the injection devices are disposed so that respective positions of the injection devices are changeable.

8. The multi-axis injection molding apparatus according to claim 2, wherein the fixed platen includes a penetration hole, and
wherein the penetration hole is adapted such that a nozzle of the in-line injection device is inserted into the penetration hole to be engaged with a nozzle touch portion of the intermediate platen, and the nozzle and the runner are connected to each other.

9. The multi-axis injection molding apparatus according to claim 2, wherein each of the injection devices includes a cylinder,
wherein the entrance is configured to directly contact with the runner of the intermediate platen so as to be connected with the runner of the intermediate platen, and
the exit is configured to directly contact with a runner of the fixed mold so as to be connected with the runner of the fixed mold.

10. A multi-axis injection molding apparatus comprising:
a fixed platen;
a movable platen;
a plurality of injection devices; and
an intermediate platen disposed between a fixed mold and the fixed platen and formed with a runner adapted to supply a molten resin from a single in-line injection apparatus to the plurality of injection devices, said fixed mold disposed between the intermediate platen and a movable mold and formed with runners adapted to supply the molten resin from the plurality of injection devices to a single cavity formed between the fixed mold and a movable mold,
wherein each of the injection devices includes a cylinder that store the molten resin therein and a plunger slidable within the cylinder so as to inject the molten resin.

11. The multi-axis injection molding apparatus according to claim 10, wherein each of the injection devices includes:
a resin supply side valve adapted to adjust a supply of the molten resin from the intermediate platen; and
a resin injection side valve adapted to adjust a supply of the molten resin to a cavity defined by the fixed mold and a movable mold,
wherein the resin supply side valve and the resin injection side valve and plungers of the injection devices operate independently from each other.

* * * * *